US012632749B2

(12) United States Patent　(10) Patent No.:　US 12,632,749 B2

Pfeil et al.　(45) Date of Patent:　May 19, 2026

(54) METHOD AND DEVICE FOR OPERATING A CLASSIFIER

(71) Applicant: Robert Bosch GmbH, Stuttgart (DE)

(72) Inventors: Thomas Pfeil, Renningen (DE); Benedikt Sebastian Staffler, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1286 days.

(21) Appl. No.: 17/206,974

(22) Filed: Mar. 19, 2021

(65) Prior Publication Data

US 2021/0304033 A1　Sep. 30, 2021

(30) Foreign Application Priority Data

Mar. 27, 2020　(DE) .......................... 102020203998.4

(51) Int. Cl.
　*G06N 5/04*　(2023.01)
　*G06N 20/00*　(2019.01)
　*H02J 7/82*　(2026.01)
　*G06F 3/14*　(2006.01)

(52) U.S. Cl.
　CPC .............. *G06N 5/04* (2013.01); *G06N 20/00* (2019.01); *H02J 7/82* (2026.01); *G06F 3/14* (2013.01)

(58) Field of Classification Search
　CPC .......... G06F 3/14; G06F 3/147; G06N 20/00; G06N 5/04; G06N 3/08; G06N 3/045; H02J 7/35; H02J 7/0048
　See application file for complete search history.

(56) References Cited

U.S. PATENT DOCUMENTS

| | | | | |
|---|---|---|---|---|
| 6,418,412 | B1 * | 7/2002 | Asghar ................... | G10L 15/20 |
| | | | | 704/256.5 |
| 12,045,724 | B2 * | 7/2024 | Lo .......................... | G06F 9/5027 |
| 2019/0073582 | A1 | 3/2019 | Yang et al. | |
| 2019/0325314 | A1 * | 10/2019 | Bourges-Sevenier | ... G06N 3/08 |
| 2020/0193273 | A1 * | 6/2020 | Chung .................... | G06F 17/16 |
| 2020/0210839 | A1 * | 7/2020 | Lo .......................... | G06F 9/5027 |
| 2020/0211576 | A1 * | 7/2020 | Beack ..................... | G06N 3/08 |
| 2020/0218982 | A1 * | 7/2020 | Annau ................ | G06F 7/49963 |
| 2021/0279635 | A1 * | 9/2021 | Gadelrab ................ | G06N 5/04 |
| 2023/0048206 | A1 * | 2/2023 | Athreya .............. | G06V 40/161 |

FOREIGN PATENT DOCUMENTS

DE　　102018220701 A1　6/2020

OTHER PUBLICATIONS

Moons, Bert, et al. "Energy-efficient convnets through approximate computing." 2016 IEEE Winter Conference on Applications of Computer Vision (WACV). IEEE, 2016. (Year: 2016).*

(Continued)

*Primary Examiner* — Randall K. Baldwin

(74) *Attorney, Agent, or Firm* — NORTON ROSE FULBRIGHT US LLP

(57) ABSTRACT

A computer-implemented classifier for ascertaining an output signal as a function of an input signal supplied to the classifier. The classifier is designed to select one type of quantization from a plurality of possible types of quantization, and to carry out the ascertainment of the output signal as a function of the selected type of quantization.

15 Claims, 7 Drawing Sheets

(56) References Cited

OTHER PUBLICATIONS

Lecoq, Simon, et al. "Low-complexity feature extraction unit for "Wake-on-Feature" speech processing." 2018 25th IEEE International Conference on Electronics, Circuits and Systems (ICECS). IEEE, 2018. (Year: 2018).*

Desappan, Kumar, et al. "CNN Inference: Dynamic and Predictive Quantization." 2018 IEEE 8th International Conference on Consumer Electronics-Berlin (ICCE-Berlin). IEEE, 2018. (Year: 2018).*

Shlezinger, Nir, and Yonina C. Eldar. "Deep Task-based quantization." arXiv preprint arXiv:1908.06845 (2019). (Year: 2019).*

Hanna, Osama A., et al. "On Distributed Quantization for Classification." arXiv preprint arXiv:1911.00216 (2019). (Year: 2019).*

Shlezinger, Nir, and Yonina C. Eldar. "Task-based quantization with application to MIMO receivers." arXiv preprint arXiv:2002.04290 (Feb. 2020). (Year: 2020).*

Jin, Qing, Linjie Yang, and Zhenyu Liao. "AdaBits: Neural Network Quantization with Adaptive Bit-Widths." arXiv preprint arXiv:1912. 09666 v2 (Mar. 15, 2020). (Year: 2020).*

Pfeiffer, Michael, and Thomas Pfeil. "Deep learning with spiking neurons: Opportunities and challenges." Frontiers in neuroscience 12 (2018): 409662. (Year: 2018).*

Imani, Mohsen, et al. "Quanthd: A quantization framework for hyperdimensional computing." IEEE Transactions on Computer-Aided Design of Integrated Circuits and Systems 39.10 (2019): 2268-2278. (Year: 2019).*

Qing Jin, et al., "Adabits: Neural Network Quantization With Adaptive Bit-Widths," Proceedings of the IEEE Conference On Computer Vision and Pattern Recognition, 2020, pp. 1-12.

Kuan Wang, et al., "HAQ: Hardware-Aware Automated Quantization With Mixed Precision," Computer Vision Foundation, Proceedings On IEEE Xplore, 2020, pp. 8612-8620.

* cited by examiner

Start

401 — select quantization

402 — supply input signals to classifier as input data

403 — computer cost values

404 — ascertain total cost

405 — change parameters of classifier

End

METHOD AND DEVICE FOR OPERATING A CLASSIFIER

CROSS REFERENCE

The present application claims the benefit under 35 U.S.C. § 119 of German Patent Application No. 102020203998.4 filed on Mar. 27, 2020, which is expressly incorporated herein by reference in its entirety.

FIELD

The present invention relates to a method for operating a classifier, a method for classifying with the aid of a classifier, a method for training a classifier, a training device, a computer program, and a machine-readable storage medium.

BACKGROUND INFORMATION

A method for quantizing feature maps by nonlinear mapping on hardware is described in German Patent Application No. DE 10 2018 220 701.

SUMMARY

Classifiers represent an essential component in modern systems, which make decisions on the basis of sensor signals. In particular, neural networks achieve very high classification accuracy in this case. A high classification accuracy is of utmost importance for many technical applications, since a correct functionality is significantly affected in many cases by the classification accuracy.

For example, it is possible that a classifier is used to determine on the basis of camera data where pedestrians are located within the planned trajectory of an autonomous vehicle. The information may be used, for example, to modify the trajectory if a collision with a pedestrian is imminent.

In this example, the classification accuracy is of utmost importance, since a pedestrian who is not detected may result in a collision of the vehicle with the pedestrian.

Classifiers may generally require a high number of computer operations to arrive at the classification. A not insignificant amount of memory is also required to store the model parameters of the classifier. These two aspects make the use of classifiers in systems such as robots more difficult, since computer and storage capacities may typically be very restricted here.

For efficient computation, quantization methods may therefore be used to reduce the resolution of the computer operations of the classifier. This offers the advantage that the power consumption of the classifier may be significantly reduced, since the resolution of the computer operations is generally incorporated quadratically in the power consumption of the classifier. In addition, the classifier requires significantly less memory for computing the outputs.

In addition, however, the advantage results that a classifier may be operated significantly more energy efficiently via special technical devices, such as specialized computational hardware, if it was quantized.

In general, a classifier may supply a good classification accuracy only for the type of quantization with which it was trained. However, it may be advantageous if a classifier may be quantized using multiple different types of quantization for the runtime. For example, the classifier may select a type of quantization of low resolution to save energy. Alternatively, it may use a type of quantization of high resolution to achieve an even more accurate classification performance.

An advantage of a classifier in accordance with an example embodiment of the present invention is that the type of quantization with which the classifier is to be quantized may be dynamically established at the inference time. This enables the behavior of the classifier to be adapted to corresponding conditions, for example, a maximum computing power available at the present time and/or a maximum permissible power consumption.

SUMMARY

In a first aspect, the present invention relates to a computer-implemented classifier for ascertaining an output signal as a function of an input signal supplied to the classifier. In accordance with an example embodiment of the present invention, the classifier is designed to select one type of quantization from a predefinable plurality of possible types of quantization, and to carry out the ascertainment of the output signal as a function of the selected type of quantization.

A classifier may be understood as a device which is designed in such a way that it may accept one or multiple input signals and may ascertain a classification output which characterizes the input signal or parts thereof. For example, a classifier may be used to determine in which parts of an image, which is provided to the classifier as an input signal, objects are located.

In addition to object detection, a classifier may also be used for other classification tasks, for example, for semantic segmentation. In this case, the classifier classifies each desired point in an input signal, for example, each pixel of a camera image, in a desired class. This may be used, for example, so that a mobile robot recognizes the limits of the drivable area of the surroundings based on an input image and plans a trajectory based thereon.

A classifier may encompass a model from the area of machine learning, such as a neural network. The model may be used to classify the input signal of the classifier. Furthermore, the classifier may include preprocessing and/or post-processing methods.

The input signals which are supplied to the classifier may be different types of input data, for example from a camera sensor, a radar sensor, a LIDAR sensor, an ultrasonic sensor, or an infrared camera sensor. Audio recordings from microphones may also be used as an input signal, for example, in the form of discretized audio signals or spectral images. It is furthermore possible that multiple types of sensor data may be combined to obtain an input signal for the classifier.

Alternatively, input signals may be synthetically generated with the aid of computer-assisted measures. For example, images may be computed or rendered based on physical models.

The output signal may be understood as a prediction of a property of the input signal by the classifier. The output signal may deviate from a desired output signal, i.e., the classifier may output an incorrect classification. In these terms, the performance of a classifier is understood as the classification accuracy, i.e., the capability of outputting a desired classification for an input signal. In general, a high performance is of utmost importance, since incorrect classifications may result in an undesired and/or dangerous behavior of a device which operates the classifier.

It is possible, for example, that a classifier is used as part of a system, the system and in particular the classifier being operated by a power source having a limited and/or varying capacity, for example, a battery and/or a renewable power source. In this example, the classifier typically represents a large part of the power consumption of the system, since the computations of the classifier are typically based on high-resolution floating-point operations which require a comparatively large amount of power. The efficiency and therefore, among other things, also the runtime of the system may therefore be increased if the classifier carries out more energy efficient computations.

To reduce the power consumption, the computations required to ascertain the output signal may be used by computer operations having a lower resolution. The classifier may be quantized for this purpose.

A quantization of the classifier may be understood to mean a reduction of the precision, i.e., the resolution of the numeric representation, which the classifier uses for its computer operations. In the following, quantization according to a specific method is referred to as types of quantization. Types of quantization may be characterized, among other things, by their resolution, i.e., the number of bits to which a value to be quantized is quantized, and/or by the interval limits which delimit the quantization, and/or its quantization steps and/or the distances between the quantization steps. Quantization of one or multiple values according to one type of quantization may be understood hereinafter to mean that the value or values is/are quantized according to the rules of the type of quantization. When reference is made hereinafter to quantization of a classifier, this may be understood as the quantization of its parameters according to a corresponding type of quantization. The ascertainment of an output signal as a function of a type of quantization may be understood to mean that at least parts of the computer operations of the classifier for ascertaining the output signal are carried out on the basis of a quantization of the classifier to the type of quantization.

It has been shown that the quantization of a classifier after the training which does not take quantization into consideration may result in a not insignificant loss of performance. This problem may be mitigated if the quantization is already taken into consideration during the training.

However, conventional methods may only train a classifier in such a way that it is designed for a specific type of quantization. Typically, the performance of a classifier may additionally also decrease for classifiers trained using quantization, if a different type of quantization is selected for the inference than for the training.

However, it may be advantageous for the inference that it is possible to select between multiple types of quantization on the basis of different conditions.

For example, it may be advantageous if a battery-operated system selects the type of quantization as a function of the charge condition of the battery. In the case of high charge of the battery, a type of quantization having a high resolution (and therefore more power-intensive from the viewpoint of the classification) may be used for the computer operations of the classifier, while in the case of low charge, a type of quantization having a low resolution may be selected.

Furthermore, it is possible that the type of the quantization may be selected as a function of the difficulty of the classification task. For example, it is possible that an object detection of very remote and correspondingly small objects is significantly more difficult than the detection of nearby objects. It is possible that in this case a type of quantization of high resolution has to be selected to achieve a desired performance. Furthermore, it is possible that for a simple classification task, a type of quantization of low resolution may already be selected to achieve a corresponding desired performance. For example, it is possible that a classifier which is to decide on the basis of image data whether it is day or night may already achieve a reasonable performance with a very low type of quantization.

For the inference, a type of quantization may be provided to the classifier for a corresponding classification task which is reasonable for the difficulty of the task.

The difficulty of a classification task and the correspondingly required resolution of the quantization step may be empirically determined via corresponding test data. For this purpose, for types of quantization of different resolution, the performance of the classifier with respect to a test data set may be determined and the type of quantization may be selected accordingly, for which the corresponding performance exceeds a predefined threshold value. If multiple types of quantization exceed the threshold value, the type of quantization having the lowest resolution may preferably be selected.

In general, a classifier which was quantized using a type of quantization of high resolution may achieve a better performance than a classifier which was quantized using a type of quantization of low resolution. However, it may be desirable that the classifier nonetheless achieves an at least approximately equal performance upon quantization using different types of quantization.

Conventional methods may train a classifier using a certain type of quantization. If a system wishes to select a different type of quantization for a utilized classifier for the inference time than was used for the training of the classifier, this may result in a significant performance loss, in particular if the desired type of quantization has a lower resolution than that which was used for the training.

An advantage of the classifier in accordance with an example embodiment of the present invention is that different types of quantization may be selected for a classifier and the performance loss between different types of quantization, in particular between types of quantization of different resolution, may be greatly reduced. This enables, for example, the selection of the type of quantization based on further requirements in addition to the performance itself.

It is possible, for example, that the classifier may be used in a method, the method being able to be executed by a system and the set of types of quantization being able to be selected as a function of an operating state of the system. The operating state may characterize, for example, an availability of resources for operating the system.

The operating state may, as described above, describe the charge condition of a battery, for example.

Furthermore, it is possible that the operating state may describe one or multiple environmental influences which underlie the system. For example, the system may be operated by a photovoltaic system. In this case, the system may predefine a type of quantization of low resolution to the classifier if it is cloudy and therefore less power is available to the system, while a type of quantization of high resolution may be selected in the case of sunshine. In this example, the operating state may be understood as the present weather conditions.

In addition, the operating state may also be characterized by other variables. For example, it is possible that a device operated by current may ascertain the present current price. In the case of a low current price, it is conceivable that a type of quantization of high resolution is predefined to the classifier, while in the case of a high current price, a type of quantization of low resolution may be selected. The operating state may be understood in this example as an economic factor.

In addition, the operating state may characterize variables other than the resources which are required to operate the system. For example, it is possible that the operating state defines a requirement for the robustness of a classifier. For example, classifiers are less susceptible to adversarial examples if a type of quantization of low resolution is used to ascertain an output signal. This fact may be utilized, for example, in such a way that multiple output signals for types of quantization of different resolution may be ascertained for one input signal. The classifications which are characterized by the different output signals may then be compared and it may thus be ascertained to what extent a certain classification is consistent. This permits the classifier to ascertain a form of uncertainty about its classification, on the basis of which the system may be activated accordingly. The operating state may be understood in this case as a requirement for the system, which describes that a robust classification is to take place.

In a further aspect, the present invention relates to a computer-implemented method for training a classifier, which includes the following steps:

predefining a set of types of quantization based on a set of possible types of quantization;

ascertaining a set of output signals on the basis of one input signal, one output signal of the set of output signals being associated in each case with one type of quantization of the set of types of quantization;

ascertaining a set of cost values, where one cost value of the set is associated in each case with one output signal of the set of output signals and describes to what extent the output signal corresponds to a desired output signal;

ascertaining the total cost value based on the set of cost values;

training the classifier as a function of the total cost value.

The method for training requires a set of possible types of quantization, which may be understood as the types of quantization on which the classifier is designed for later operation. Furthermore, a data set of input signals may be used for the training, which is also referred to hereinafter as the training data set.

For one or more input signals of the training data set, a set of output signals is generated in each case for the training. These output signals each characterize a classification and may be compared to a desired output signal associated with the corresponding input signal. This comparison preferably takes place on the basis of a cost function, by which a particular cost value may be ascertained which characterizes a measure of to what extent a corresponding output signal deviates from the desired output signal.

The output signals ascertained for various types of quantization may be combined via a fusion function to thus obtain a total cost value. Alternatively, it is possible that for one training step only one type of quantization from the set of the possible types of quantization was selected and correspondingly one output signal is ascertained per input signal. In this case, the ascertained cost value may be used directly as the total cost value.

The advantage of this procedure is that the classifier may be trained in such a way that it is designed for ascertaining output signals for different types of quantization. In particular, a classifier trained by this method may enable a reasonable performance for various types of quantization, the quantization being based on the same parameters of the classifier. This has the result that only one set of parameters has to be kept ready for the use of the classifier and different parameters do not have to be stored for each type of quantization.

It is furthermore possible that the classifier may be trained, among other things, using types of quantization of low resolution, even if these types of quantization are not provided for use in the case of an inference by the classifier. A training using types of quantization of low resolution causes a regularization of the classifier, since the low resolutions cause a high level of quantization noise. This regularization advantageously results in a classifier which is more robust with respect to interference in the input signal, which results in a higher performance of the classifier.

In a further aspect of the present invention, it is possible that the training of the classifier is carried out in batches and for each batch, in the step of predefining a set of types of quantization, one type of quantization is predefined randomly from the set of possible types of quantization.

The term "batch" may be understood as a set of input signals which are provided as a set to the classifier and the classifier ascertains the output signals for the input signals of a batch. For the training in batches, the data set may be divided into batches of a certain size, which are supplied to the classifier step-by-step. The training of the classifier may be carried out in such a way that in one training step one batch is selected and a set of total cost values is ascertained accordingly on the basis of the input signals of the batch. The classifier may then be trained corresponding to a weighted sum of these total cost values.

For one batch, a subset of the possible types of quantization may be used to quantize the classifier during the training. Preferably, for this purpose one type of quantization may be selected randomly from the set of the possible types of quantization for various batches. The advantage of this procedure is that multiple output signals do not have to be determined for each of the input signals of a batch, by which the processing time of a batch by the classifier is shortened. In this way, the classifier is made capable of processing more batches in a certain time period and thus extracting more pieces of information from the training data. This results in a faster convergence of the training and a higher performance of the classifier.

In the various aspects of the present invention, the term "computer" includes arbitrary devices for processing predefinable computation rules. These computation rules may be provided in the form of software, or in the form of hardware, or also in a mixed form of software and hardware.

BRIEF DESCRIPTION OF THE DRAWINGS

Specific embodiments of the present invention are explained in greater detail below.

DETAILED DESCRIPTION OF EXAMPLE EMBODIMENTS

Figure 1:
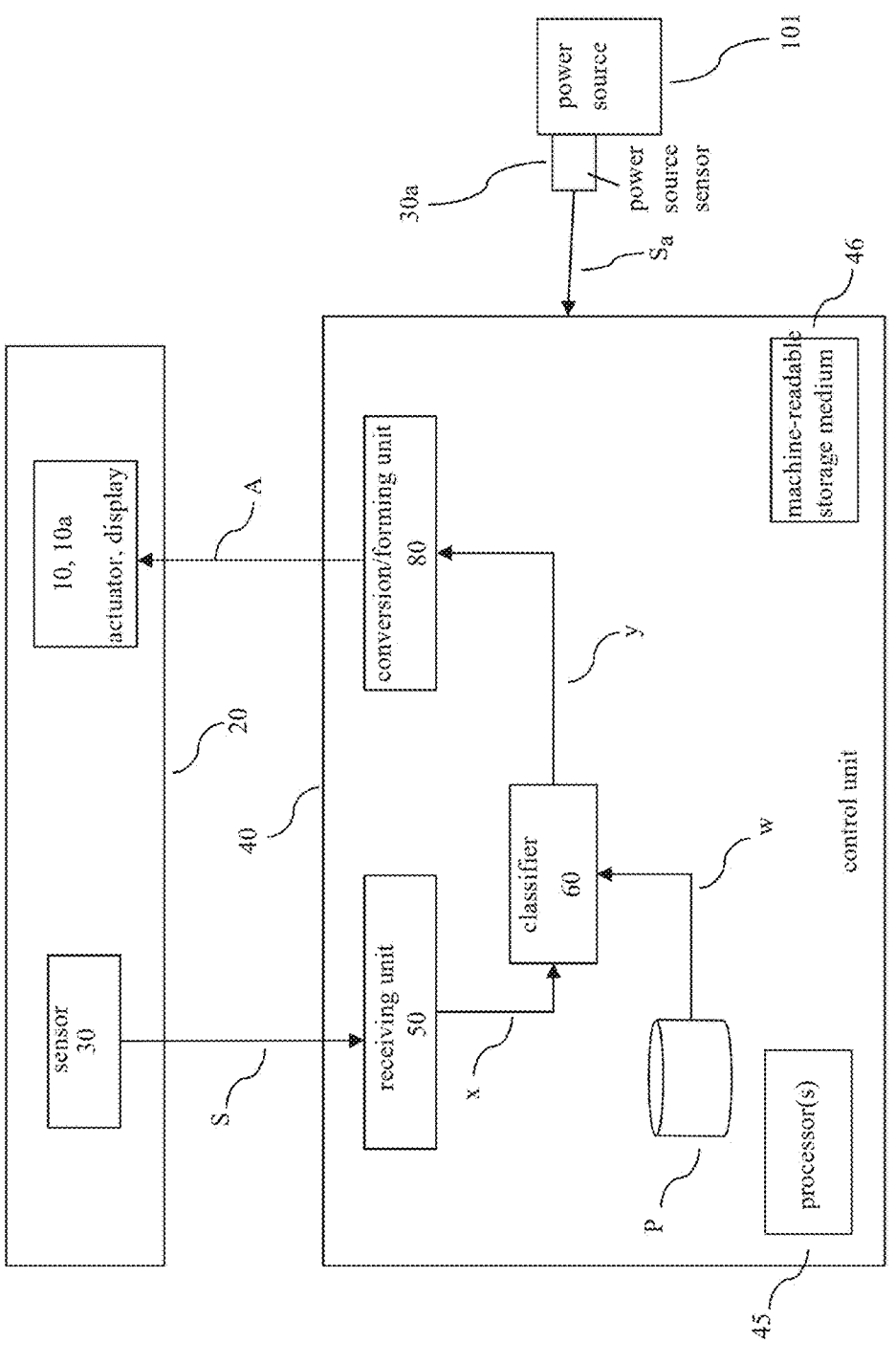
FIG. 1 schematically shows a structure of a control system, in accordance with an example embodiment of the present invention.

FIG. 1 shows an actuator 10 in its surroundings 20 in interaction with a control system 40. Control system 40 may preferably be operated by a power source 101. Furthermore, pieces of information which affect power source 101 may preferably be transmitted from a power source sensor 30a to control system 40. At preferably regular temporal intervals, surroundings 20 are detected in a sensor 30, in particular an imaging sensor such as a video sensor, which may also be provided by a plurality of sensors, for example a stereo camera. Sensor signal S—or one sensor signal S each in the case of multiple sensors—of sensor 30 is transmitted to control system 40. Control system 40 thus receives a sequence of sensor signals S. Control system 40 ascertains activation signals A therefrom, which are transmitted to actuator 10. Alternatively or additionally, it is conceivable that a display device 10a, for example a display screen, is activated by activation signal A, display device 10a playing back pieces of information corresponding to activation signal A.

Control system 40 receives the sequence of sensor signals S of sensor 30 in an optional receiving unit 50, which converts the sequence of sensor signals S into a sequence of input images x (alternatively sensor signal S may also be directly adopted in each case as input image x). Input image x may be, for example, a detail or a further processing of sensor signal S. Input image x includes single frames of a video recording. In other words, input image x is ascertained as a function of sensor signal S. The sequence of input images x is supplied to a classifier 60.

Classifier 60 is preferably parameterized by parameters w which are stored in a parameter memory P and provided thereby. For this purpose, the classifier may be made up of first layers. In this case, first parameters $w_1$ of the first layers form parameters w of the classifier. Furthermore, it is conceivable that classifier 60 quantizes parameters w before it uses them to compute an output signal y. Type of quantization $q_1, q_2, q_3$ is preferably one which was already used during the training of the classifier.

In further specific embodiments, it is conceivable that classifier 60 ascertains a corresponding plurality of output signals $y_1, y_2, y_3$ on the basis of a plurality of types of quantization $q_1, q_2, q_3$. Output signals $y_1, y_2, y_3$ may then be output in a set of output signals y by the classifier.

The quantization itself may take place in different ways. For example, the parameters may be quantized on a predefined number of discrete quantization points at equal distances in an interval as follows $$q(x) = \text{sgn}(x) \cdot \Delta \left\lfloor \frac{|x|}{\Delta} + \frac{1}{2} \right\rfloor,$$

q being the quantized parameter, x being a parameter, and $\Delta$ being a step width between the quantization points. If the parameter is less than the left interval limit, the quantized parameter may preferably be set to the left interval limit. If it is greater than the right interval limit, it may preferably be set to the right interval limit.

The quantization may also take place nonlinearly between a minimum and a maximum interval limit. For this purpose, for example, ranges of the interval may have high resolution, i.e., may contain many quantization points, while other points of the interval have low resolution, i.e., contain few quantization points. In relation to the linear quantization, the distances between quantization points may be different in size here.

In further specific embodiments, the type or types of quantization, with which the classifier 60 is quantized, is or are determined on the basis of a sensor signal $S_a$ of power source sensor 30a. For example, power source sensor 30a may be a sensor for determining the present charge condition of a battery 101 and further sensor signal $S_a$ may characterize the instantaneous charge condition of battery 101. Classifier 60 may then select one or multiple types of quantization on the basis of further sensor signal $S_a$, which are to be used to quantize parameters w. For example, at a low charge condition of battery 101, a type of quantization having lower resolution may be used.

Classifier 60 ascertains one or multiple output signals $y, y_1, y_2, y_3$ from input images x. Output signal or signals $y, y_1, y_2, y_3$ is or are supplied to an optional forming unit 80, which ascertains activation signals A therefrom, which are supplied to actuator 10 to activate actuator 10 accordingly. An output signal $y, y_1, y_2, y_3$ may include, for example, pieces of information about objects which sensor 30 has detected.

In a further exemplary embodiment, classifier 60 of control system 40 ascertains a corresponding number of output signals $y_1, y_2, y_3$ on the basis of at least two types of quantization and outputs them as a set of output signals y. Conversion unit 80 may determine in this case to what extent output signals $y_1, y_2, y_3$ deviate from one another.

For the case that output signals $y_1, y_2, y_3$ characterize identical or at least similar classifications, conversion unit 80 may output an activation signal A to actuator 10, which characterizes a normal activation of actuator 10. For the case that output signals $y_1, y_2, y_3$ characterize classifications deviating from one another, the activation of actuator 10 may be limited or it is possible to switch over to a control of actuator 10 by a person. Furthermore, it is conceivable that conversion unit 80 provides an activation signal A to a display screen 10a, which displays to a person, such as the manufacturer of control system 40, the deviation of the classification in a suitable way. This may be carried out, for example, via a warning that irregularities have occurred in the perception of surroundings 20.

In further exemplary embodiments, it is possible that sensor 30 is an acoustic sensor, for example a microphone, which may detect noise and/or speech signal S in surroundings 20. Classifier 60 may be designed in this case to classify noises and/or speech commands determined from audio signals x transferred to it. For example, classifier 60 may ascertain whether audio signal x contains signal tones, such as sirens or other warning tones. Alternatively, it is conceivable that classifier 60 ascertains speech commands, a correspondingly ascertained command being able to be transmitted via activation signal A to actuator 10, 10a.

In the above-mentioned exemplary embodiments, actuator 10 receives activation signals A, is activated accordingly, and carries out a corresponding action. Actuator 10 may include in this case an activation logic not necessarily structurally integrated, which ascertains a second activation signal from activation signal A, using which actuator 10 is then activated.

In further specific embodiments, control system 40 includes sensor 30. In still further specific embodiments, control system 40 alternatively or additionally also includes actuator 10. In still further specific embodiments, the control system includes power source 101 and/or power source sensor 30a.

In further preferred specific embodiments, control system 40 includes at least one processor 45 and at least one machine-readable storage medium 46, on which instructions are stored which, when they are executed on a processor or processors 45, prompt control system 40 to carry out the method according to the present invention.

Figure 2:
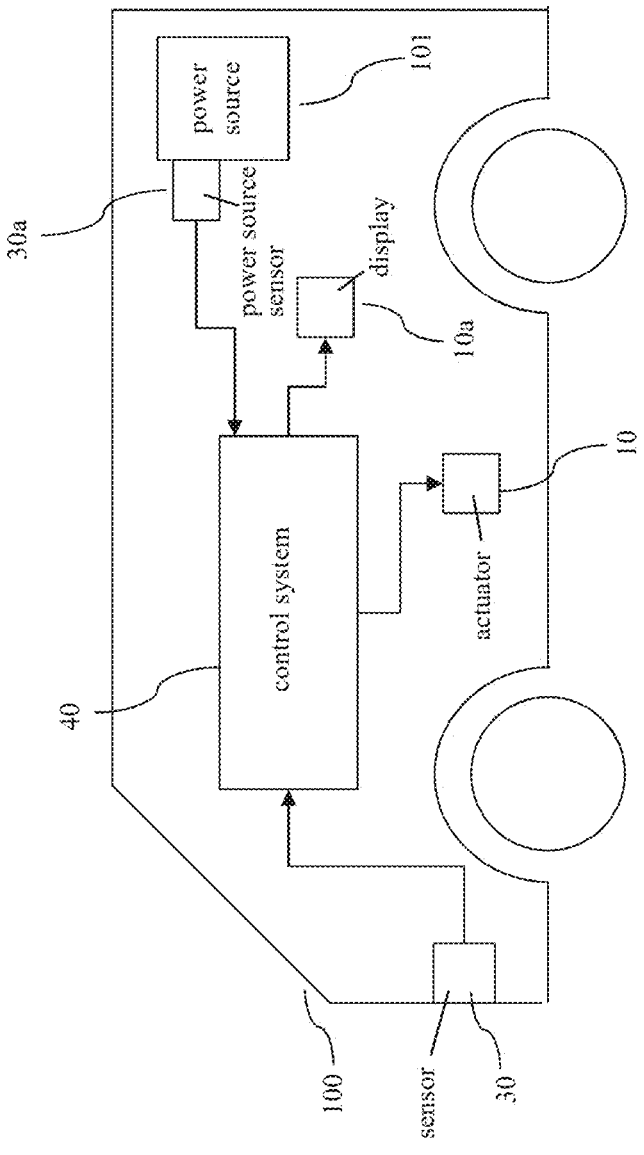
FIG. 2 schematically shows an exemplary embodiment of the control of an at least semi-autonomous robot, in accordance with an example embodiment of the present invention.

FIG. 2 shows how control system 40 may be used to control an at least semi-autonomous robot, an at least semi-autonomous and battery-operated motor vehicle 100 here. In this exemplary embodiment, both control system 40 and actuators 10, 10a of the vehicle may be operated via at least one battery 101, which is preferably installed in vehicle 100. Control system 40 is preferably also supplied with power by battery 101.

Sensor 30 may be a video sensor preferably situated in motor vehicle 100, for example, classifier 60 being able to be configured to identify objects from input images x.

Actuator 10, which is preferably situated in motor vehicle 100, may be, for example, a brake, a drive, or a steering system of motor vehicle 100. In further exemplary embodiments, multiple actuators 10 may also be controlled by the control system. Activation signal A may be ascertained in such a way that actuator or actuators 10 is/are activated in such a way that motor vehicle 100 prevents, for example, a collision with objects identified by classifier 60, in particular if they are objects of certain classes, for example pedestrians.

Alternatively, it is possible that sensor 30 is a microphone and classifier 60 classifies on the basis of recorded audio signals S of microphone 30 whether sirens of emergency vehicles are audible in surroundings 20. If classifier 60 detects a siren in the audio signal, actuator 10 of vehicle 100 may be activated, for example, so that vehicle 100 forms an emergency lane.

Furthermore, it is possible that output signals y_1,y_2,y_3 for various types of quantization q_1,q_2,q_3 are ascertained by classifier 60 and conversion unit 80 ascertains an uncertainty with respect to the classification. For the case in which the uncertainty exceeds a predefined threshold value, the control system may instruct a person via, for example, a display 10a of the vehicle to take over the control of vehicle 100.

Alternatively, the at least semi-autonomous robot may also be another mobile robot which is not shown, for example such as a robot which moves by flying, swimming, diving, or stepping. The mobile robot may also be, for example, an at least semi-autonomous lawnmower or an at least semi-autonomous cleaning robot. Activation signal A may also be ascertained in these cases in such a way that drive and/or steering of the mobile robot are activated in such a way that the at least one semi-autonomous robot prevents, for example, a collision with objects identified by classifier 60.

Alternatively or additionally, display unit 10a may be activated using activation signal A, and, for example, the ascertained safe areas may be displayed.

Figure 3:
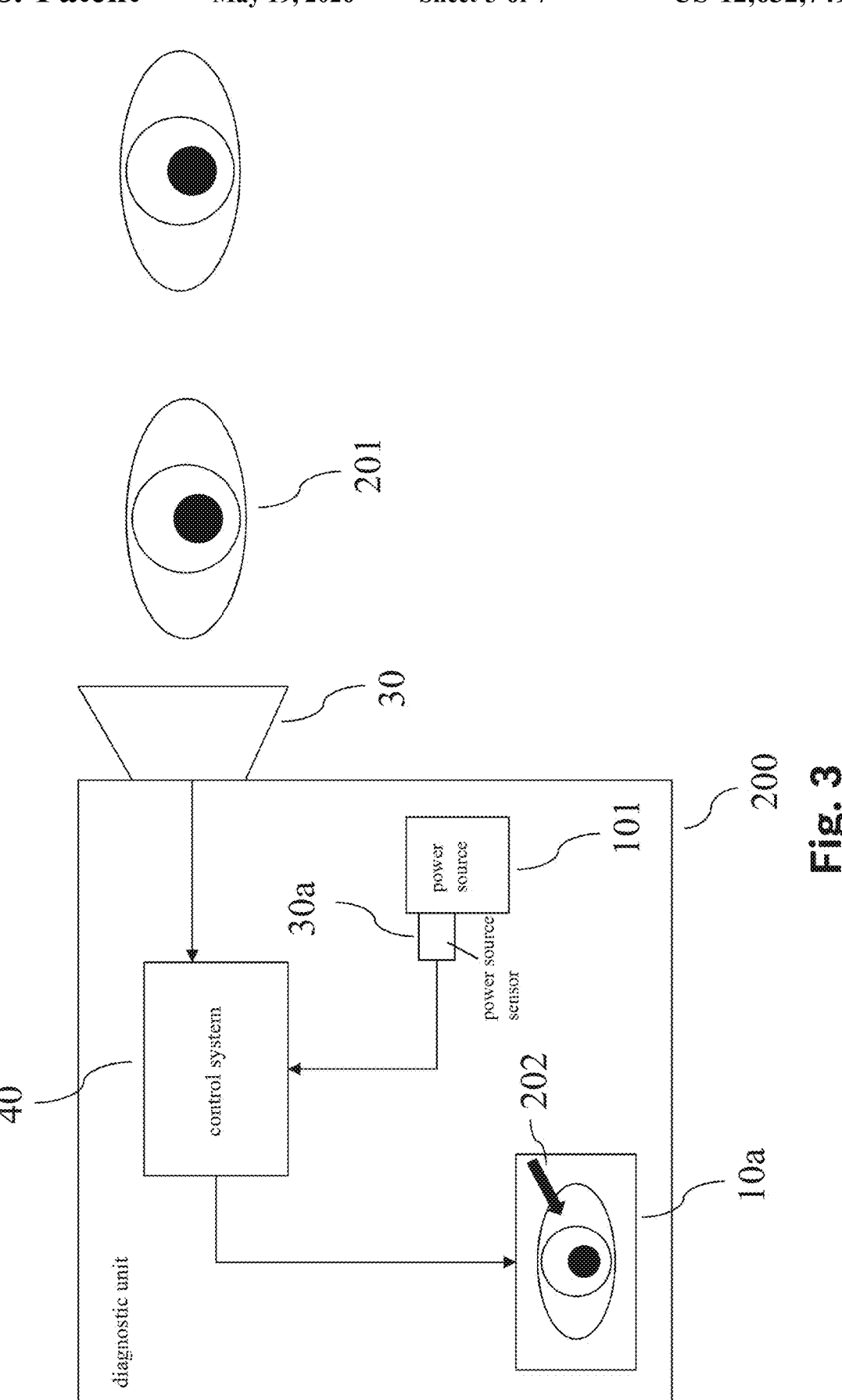
FIG. 3 schematically shows an exemplary embodiment of the control of a personal assistant, in accordance with an example embodiment of the present invention.

FIG. 3 shows an exemplary embodiment, in which control system 40 is used to control a battery-operated medical diagnostic unit 200. Diagnostic unit 200 may record an image of eyes 201 of a patient using a camera sensor 30. Subsequently, classifier 60 classifies on the basis of the image whether there is an illness of the eye. For the case in which an illness has been detected by classifier 60, the image may be displayed on a display device 10a of diagnostic unit 200 and a corresponding point of the eye may be marked 202 on the image.

Diagnostic unit 200 is preferably operated by a battery 101, which is preferably installed in diagnostic unit 200. In particular, classifier 60 may also be operated by battery 101. The control system is capable of receiving pieces of information about the charge condition of battery 101 via a charge condition sensor 30a. These pieces of information may be used to ascertain a type of quantization $q_1,q_2,q_3$, on the basis of which classifier 60 carries out the classification.

For the case in which charge condition sensor 30a measures a battery charge below a predefined threshold value, control system 40 may preferably select a type of quantization $q_1,q_2,q_3$ of low resolution for following classifications of classifier 60. For the case in which the battery charge corresponds to or exceeds the threshold value, the control system may preferably select a type of quantization $q_1,q_2,q_3$ of high resolution.

For the classification, classifier 60 may receive the image and selected type of quantization $q_1,q_2,q_3$ and on this basis ascertain an output signal $y,y_1,y_2,q_3$, which characterizes to what extent and at which point an illness of the eye exists. These pieces of information may subsequently be formed by forming unit 80 of control system 40 into a corresponding activation signal A and visually displayed accordingly by display device 10a. Additionally, it is conceivable that in addition to the pieces of information with respect to the illness, selected type of quantization $q_1,q_2,q_3$ is also displayed on display device 10a.

In a further exemplary embodiment, it is possible that control system 40 selects multiple types of quantization $q_1,q_2,q_3$ and the classifier ascertains an output signal $y,y_1, y_2,y_3$ in each case for each of types of quantization $q_1,q_2,q_3$ based on the image. These output signals $y,y_1,y_2,y_3$ may be processed using known ensemble or fusion technologies by forming unit 80 of control system 40 to obtain an activation signal A of display device 10a. Additionally, it is conceivable that forming unit 80 ascertains an uncertainty measure based on the deviations of output signal $y,y_1,y_2,y_3$, for example an entropy or a transinformation. This uncertainty measure may preferably also be transmitted in activation signal A to display device 10a, for example to indicate ranges of uncertain classification on display device 10a.

Figure 4:
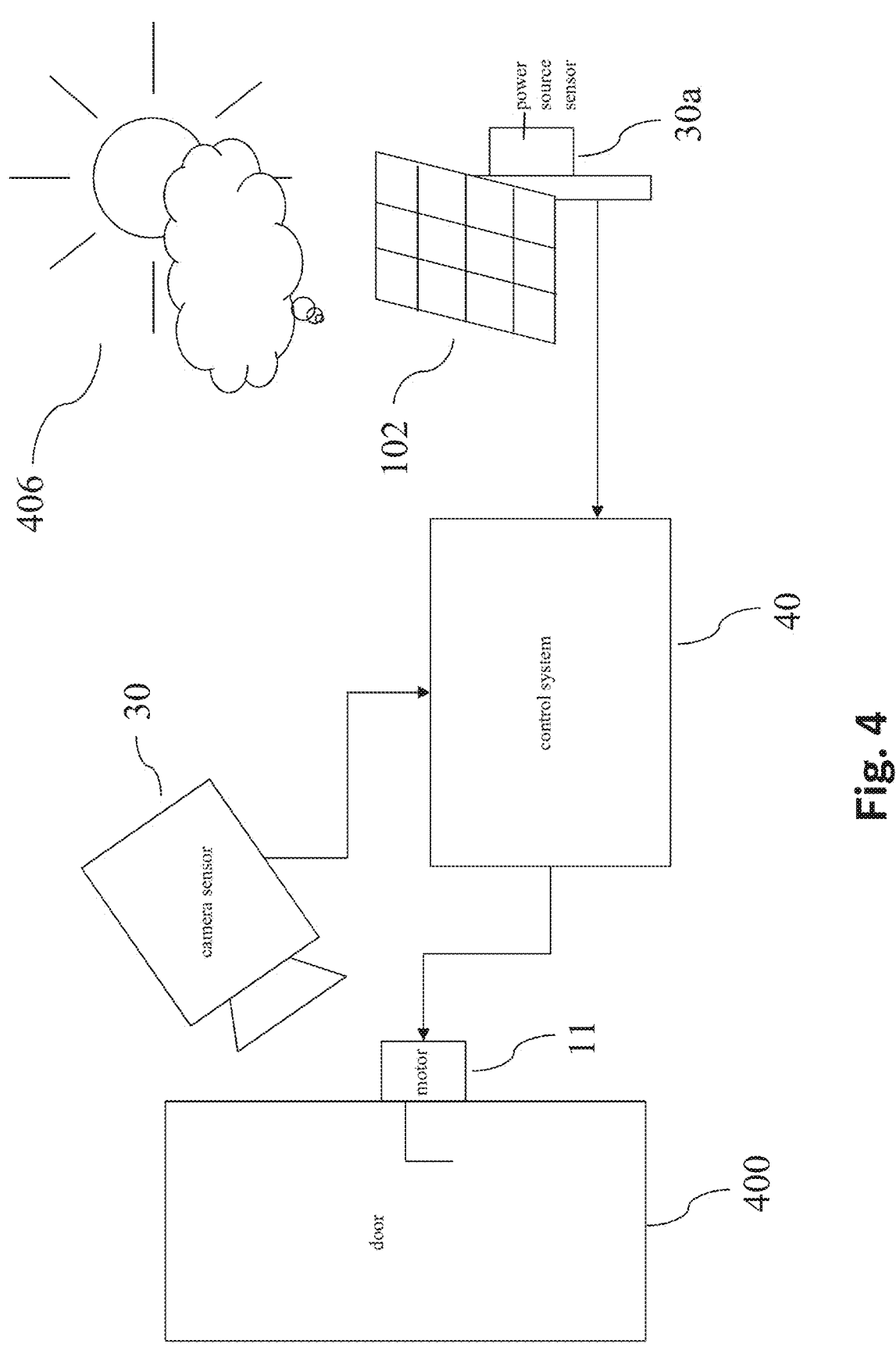
FIG. 4 schematically shows an exemplary embodiment of a first layer of a classifier, in accordance with an example embodiment of the present invention.

FIG. 4 shows an exemplary embodiment in which control system 40 is used to activate an access control system. The access control system may contain a door 400, for example, which may be opened or closed by a motor 11. Control system 40 activates motor 11 based on images of a camera sensor 30.

Camera sensor 30 may observe the surroundings of the door for this purpose. The images of camera sensor 30 may be processed by classifier 60. Classifier 60 may detect for the images where persons are located in the images and predict their identity. If a person has been detected and their identity has been determined by classifier 60, it may be checked whether the person may be allowed access to the area behind the door. This may be carried out, for example, via a comparison of the identity of the detected person to a database.

For the case that the person is to be allowed access, control system 40 may send a corresponding activation signal A to motor 11, which prompts motor 11 to open the door.

It is possible that the access control system, in particular classifier 60 of control system 40, is supplied with power by a photovoltaic system 102. Furthermore, it is conceivable that photovoltaic system 102 includes a weather sensor 30a, which may determine pieces of information about present weather conditions 402. For example, weather sensor 30a may determine to what extent solar irradiation will be available for generating power in the photovoltaic system in the immediate future. The weather sensor 30a may provide this information to control system 40. Control system 40 may determine on the basis of this information a type of quantization q_1,q_2,q_3, with which classifier 60 is to be quantized. In the case of little solar irradiation, for example, a type of quantization q_1,q_2,q_3 of low resolution may be selected, while in the case of high solar irradiation, a type of quantization q_1,q_2,q_3 of high resolution may be selected.

Figure 5:
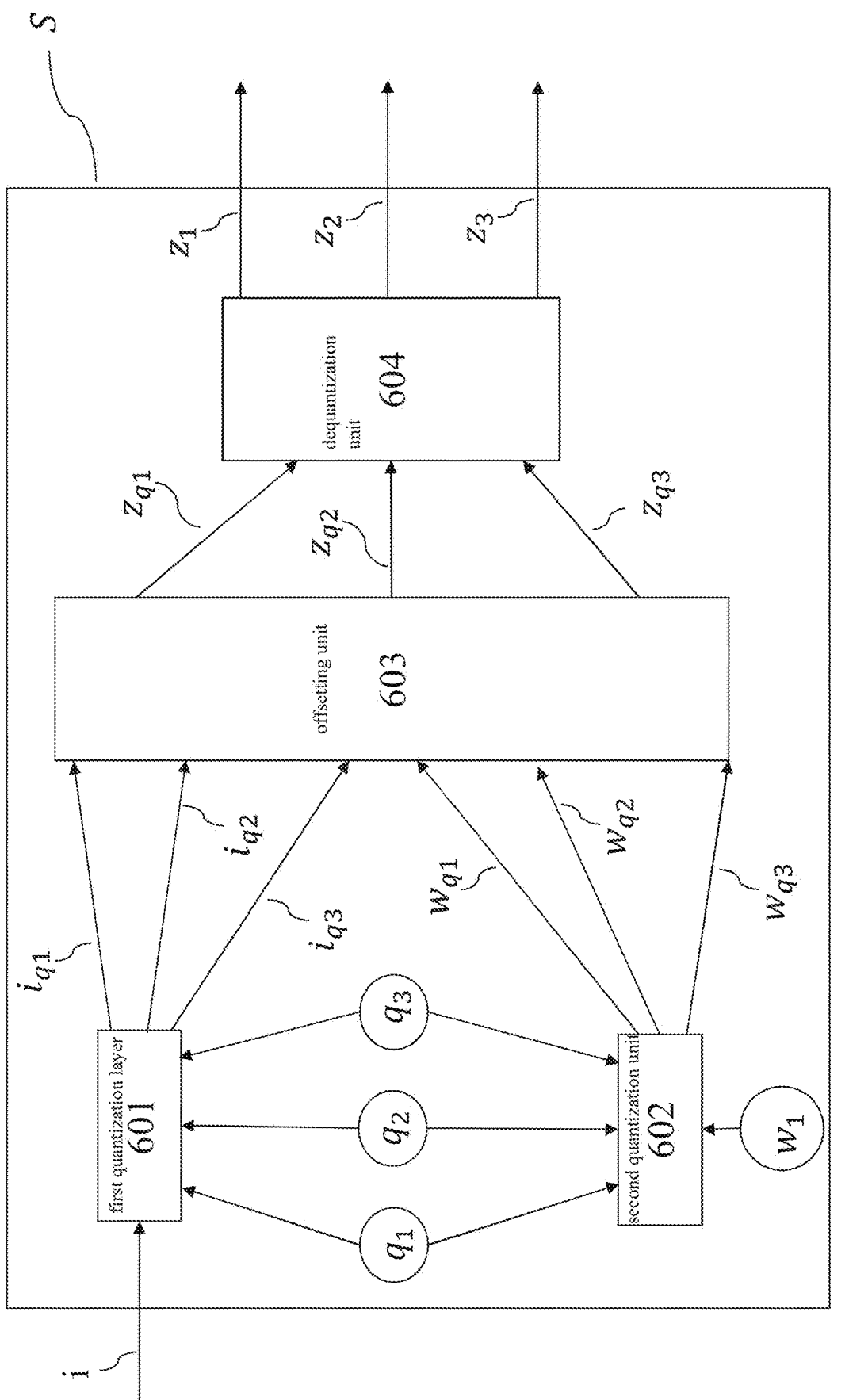
FIG. 5 schematically shows the ascertainment of a total cost value by a classifier, in accordance with an example embodiment of the present invention.

FIG. 5 shows a first layer $S_1$ of a classifier 60. First layer $S_1$ includes first weights $w_1$. In a first quantization unit 601, first layer $S_1$ quantizes a first input signal i on the basis of a set of types of quantization $q_1,q_2,q_3$ to a set of quantized input signals $i_{q1},i_{q2},i_{q3}$. For each type of quantization $q_1,q_2,q_3$, first quantization unit 601 generates a corresponding quantized input signal $i_{q1},iq_2, i_{q3}$ for this purpose. First weights $w_1$ are quantized by a second quantization unit 602 on the basis of a set of types of quantization $q_1,q_2,q_3$, to obtain a set of quantized weights $w_{q1},w_{q2},w_{q3}$. For each type of quantization $q_1,q_2,q_3$, second quantization unit 601 generates a corresponding quantized weight $w_{q1},w_{q2},w_{q3}$ for this purpose. The quantized input corresponding to a type of quantization $q_1,q_2,q_3$ and the weight or weights quantized for the same quantization step may subsequently be offset by an offsetting unit 603 to obtain a correspondingly quantized output signal $z_{q1},z_{q2},z_{q3}$.

It is possible that quantized input signals $i_{q1},i_{q2}, i_{q3}$ ascertained for a type of quantization and quantized weights $w_{q1},w_{q2},w_{q3}$ ascertained for the same type of quantization are each provided in the form of a matrix. In this case, the computation unit may determine the corresponding quantized output by matrix multiplication.

In a further exemplary embodiment, it is possible that quantized input signals $i_{q1},i_{q2},i_{q3}$ ascertained for a type of quantization and quantized weights $w_{q1},w_{q2},w_{q3}$ ascertained for the same type of quantization are each provided in the form of an at least three-dimensional tensor. In this case, the computation unit may determine the corresponding quantized output by discrete convolution of the corresponding quantized input with the corresponding quantized weights as a convolution mask.

In the above-described exemplary embodiments, quantized output signal $z_{q1},z_{q2},z_{q3}$ may be used directly as output signals $z_1,z_2,z_3$. Alternatively, an optional dequantization unit 604 may be used to transform the quantized output signals $z_1,z_2,z_3$ into the value range of first input i.

In further exemplary embodiments, it is possible that to ascertain a quantized output signal $z_{q1}z_{q2},z_{q3}$, corresponding input signal $i_1,i_2,i_3$ and corresponding weights $w_1,w_2,w_3$ are quantized to different types of quantization $q_1,q_2,q_3$. For example, it is conceivable that input signal $i_1,i_2,i_3$ is quantized using a type of quantization $q_1,q_2,q_3$ of lower resolution than corresponding weights $w_1,w_2,w_3$ or vice versa.

Figure 6:
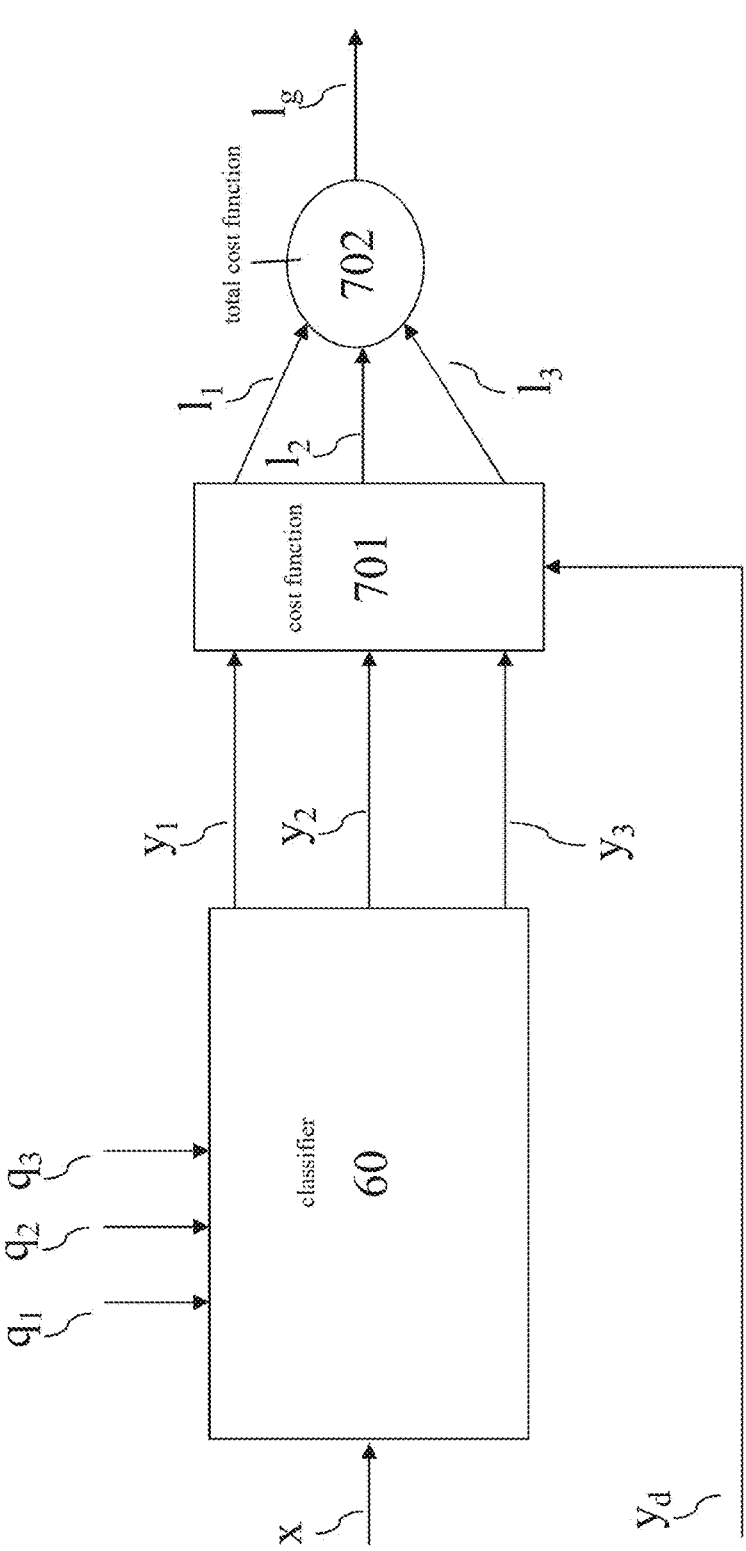
FIG. 6 shows a schematic flowchart which shows the training of a classifier, in accordance with an example embodiment of the present invention.

FIG. 6 schematically shows the ascertainment of a total cost value $l_g$ based on an input signal x and a desired output $y_d$. In this exemplary embodiment, based on input signal x and a set of types of quantization $q_1,q_2,q_3$, one output signal $y_1,y_2,y_3$ is ascertained in each case per type of quantization $q_1,q_2,q_3$ by classifier 60. For each of output signals $y_1,y_2,y_3$, a separate cost value $l_1,l_2,l_3$ is ascertained by a cost function 701. For this purpose, desired output signal $y_d$ may be provided in the form of a one-hot encoding and the cross-entropy function may be used as the cost function, for example.

On the basis of ascertained cost values $l_1,l_2,l_3$, a total cost value $l_g$ is subsequently ascertained by a total cost function 702. For example, a function may be used as total cost function 702 which ascertains the average of all cost values $l_1,l_2,l_3$. Alternatively, it is conceivable that total cost value $l_g$ is ascertained on the basis of a weighted sum of individual cost value $l_1,l_2,l_3$.

Figure 7:
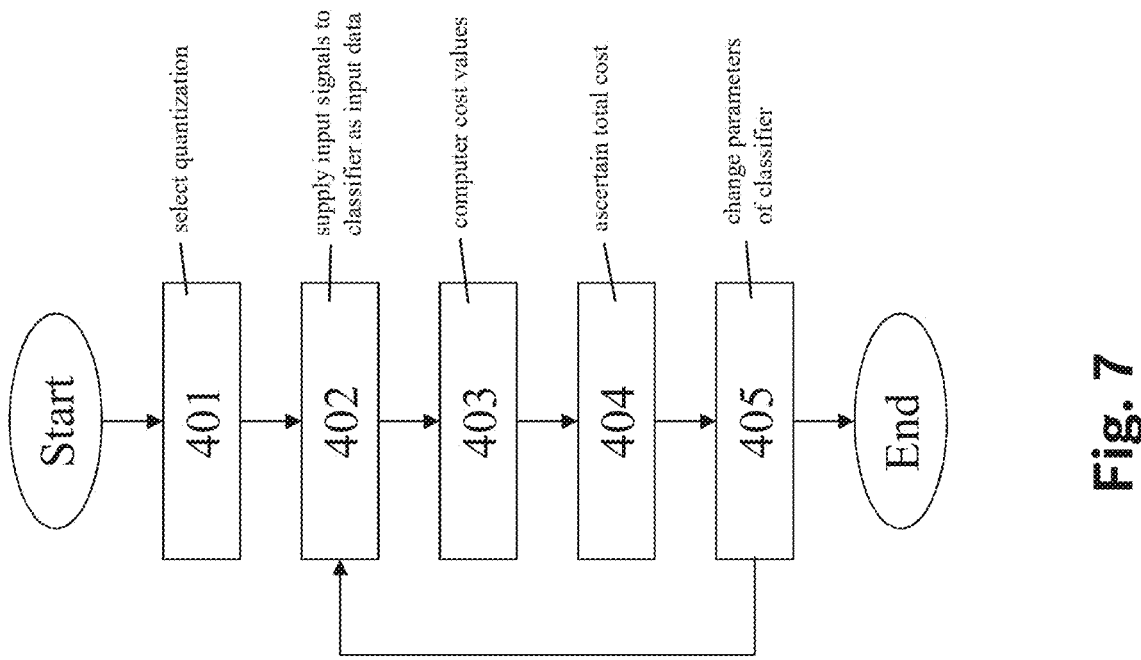
FIG. 7 schematically shows a method sequence for training a classifier.

FIG. 7 schematically shows a method sequence for training a classifier 60.

In a first step 401, initially types of quantization q_1,q_2, q_3 are selected, which are to be used for the training. Types of quantization having a different resolution may preferably be selected here. Preferably, two or more types of quantization are selected, for example, linear quantizations on 2-bit, 4-bit, and 8-bit representations.

In a second step 402, input signals x are supplied to classifier 60 as training data, the training data containing input signals x and desired output signals $y_d$ of classifier 60 corresponding to input signals x. For each input signal x, classifier 60 may ascertain an output signal $y_1,y_2,y_3$ for one of the types of quantization $q_1,q_2,q_3$ selected in first step 401, in that it is initially quantized to the type of quantization. The type of quantization may be ascertained randomly here from types of quantization $q_1,q_2,q_3$ determined in first step 401. Alternatively, it is also conceivable that classifier 60 determines one output signal $y_1,y_2,y_3$ in each case for all types of quantization $q_1,q_2,q_3$ selected in the first step.

Output signals $y_1,y_2,y_3$ ascertained by the classifier may be supplied in a third step 403 to a cost function, in order to compute a cost value for each output signal $y_1,y_2,y_3$, which characterizes to what extent respective output signal $y_1,y_2,y_3$ deviates from desired output signal $y_d$ corresponding to input signal x. The cross-entropy function may be used for this purpose, for example.

In a fourth step 404, a total cost value $l_g$ is ascertained from individual cost values $l_1,l_2,l_3$. Total cost value $l_g$ may be for this purpose, for example, the average of all cost values $l_1,l_2,l_3$. Alternatively, it is conceivable that total cost value $l_g$ is ascertained on the basis of a weighted sum of individual cost values $l_1,l_2,l_3$.

In a fifth step 405, parameters w of classifier 60 are changed on the basis of total cost value $l_g$. For this purpose, initially the gradient of the total cost value is ascertained in relation to parameters w. Subsequently the weights may be adapted via a gradient descent method, such as SGD or Adam.

In further exemplary embodiments, steps two 402 through five 405 may be iteratively repeated until a desired number of iterations has been reached.

In further exemplary embodiments (not shown), steps one 401 through five 405 may be iteratively repeated until a desired number of iterations has been reached. For each iteration, one type of quantization may preferably be selected from the set of possible types of quantization $q_1,q_2,q_3$, which is used for this iteration.

What is claimed is:

1. A computer-implemented classifier implemented on computer hardware, the computer hardware configured to:
ascertain an output signal as a function of an input signal supplied to the classifier, a set of types of quantization from a predefinable plurality of possible types of quantization being provided to the classifier; and quantize according to the possible types of quantization; wherein the classifier is configured to ascertain the output signal as a function of the provided set of types of quantization, wherein a plurality of output signals using different types of quantization is ascertained for the input signal and based on the plurality of the output signals, an output uncertainty and/or an ensemble decision is ascertained, and wherein the classifier is configured to operate in batches, and for each batch of the batches, the set of types of quantization is predefined, one type of quantization is predefined randomly from the possible types of quantization, wherein the one type of quantization is predefined randomly by one of selecting, ascertaining, identifying, or determining the one type of quantization from the plurality of possible types of quantization.

2. A computer-implemented method for operating a classifier, the classifier being configured to ascertain an output signal as a function of an input signal supplied to the classifier, a set of types of quantization from a predefinable plurality of possible types of quantization being provided to the classifier, and quantize according to the possible types of quantization, wherein the classifier is configured to ascertain the output signal as a function of the provided set of types of quantization, the method comprising the following steps:

providing the set of types of quantization; and ascertaining a set of output signals, each of the output signals of the set of output signals being associated with one type of quantization of the set of types of quantization, wherein a plurality of output signals using different types of quantization is ascertained for the input signal and based on the plurality of the output signals, an output uncertainty and/or an ensemble decision is ascertained, and wherein the method is carried out in batches, and for each batch of the batches, in a step of predefining the set of types of quantization, one type of quantization is predefined randomly from the possible types of quantization, wherein the one type of quantization is predefined randomly by one of selecting, ascertaining, identifying, or determining the one type of quantization from the plurality of possible types of quantization.

3. The method as recited in claim 2, wherein the method is carried out by a control system, which includes the classifier, and the set of types of quantization is selected as a function of an operating state of the control system.

4. The method as recited in claim 3, wherein the operating state characterizes an availability of resources for operating the control system.

5. The method as recited in claim 4, wherein the control system is operated by a battery and the operating state characterizes a charge condition of the battery.

6. The method as recited in claim 3, wherein the operating state characterizes an availability of resources for operating the classifier.

7. The method as recited in claim 6, wherein the classifier is operated by a battery and the operating state characterizes a charge condition of the battery.

8. The method as recited in claim 3, wherein the operating state characterizes a requirement for a robustness of the classifier.

9. The method as recited in claim 2, wherein based on one or more output signals of the set of output signals, an actuator and/or a display device is activated accordingly.

10. A computer-implemented method for training a classifier, wherein the classifier is configured to ascertain an output signal as a function of an input signal supplied to the classifier, a set of types of quantization from a predefinable plurality of possible types of quantization being provided to the classifier, and quantize according to the possible types of quantization, wherein the classifier is configured to ascertain the output signal as a function of the provided set of types of quantization, the method for training comprising:

providing the set of types of quantization based on a set of possible types of quantization;

ascertaining a set of output signals, each of the output signals of the set of output signals being associated with one type of quantization of the set of types of quantization;

ascertaining a set of cost values, each cost value of the set of cost values being associated with one output signal of the set of output signals and describing to what extent the output signal corresponds to a desired output signal;

ascertaining a total cost value based on the set of cost values; and training the classifier as a function of the total cost value, wherein a plurality of output signals using different types of quantization is ascertained for the input signal and based on the plurality of the output signals, an output uncertainty and/or an ensemble decision is ascertained, and wherein the classifier is configured to operate in batches, and for each batch of the batches, in a step of predefining the set of types of quantization, one type of quantization is predefined randomly from the possible types of quantization, wherein the one type of quantization is predefined randomly by one of selecting, ascertaining, identifying, or determining the one type of quantization from the plurality of possible types of quantization.

11. A method for using a classifier, wherein the classifier is configured to ascertain an output signal as a function of an input signal supplied to the classifier, a set of types of quantization from a predefinable plurality of possible types of quantization being provided to the classifier, and quantize according to the possible types of quantization, wherein the classifier is configured to ascertain the output signal as a function of the provided set of types of quantization, the method comprising the following steps:

training the classifier;

providing the trained classifier for an inference device; and ascertaining one or multiple output signals, the output signals being ascertained by the inference device, wherein a plurality of output signals using different types of quantization is ascertained for the input signal and based on the plurality of the output signals, an output uncertainty and/or an ensemble decision is ascertained, and wherein the method is carried out in batches, and for each batch of the batches, in a step of predefining the set of types of quantization, one type of quantization is predefined randomly from the possible types of quantization, wherein the one type of quantization is predefined randomly by one of selecting, ascertaining, identifying, or determining the one type of quantization from the plurality of possible types of quantization.

12. The method as recited in claim 11, wherein the classifier is trained by:

providing the set of types of quantization based on a set of possible types of quantization;

ascertaining a set of output signals, each of the output signals of the set of output signals being associated with one type of quantization of the set of types of quantization;

ascertaining a set of cost values, each cost value of the set of cost values being associated with one output signal of the set of output signals and describing to what extent the output signal corresponds to a desired output signal;

ascertaining a total cost value based on the set of cost values; and training the classifier as a function of the total cost value.

13. The method as recited in claim 11, wherein the one or multiple output signals are ascertained by:

providing the set of types of quantization; and ascertaining a set of output signals, each of the output signals of the set of output signals being associated with one type of quantization of the set of types of quantization.

14. A training device configured to train a classifier, wherein the classifier is configured to ascertain an output signal as a function of an input signal supplied to the classifier, a set of types of quantization from a predefinable plurality of possible types of quantization being provided to the classifier, and quantize according to the possible types of quantization, wherein the classifier is configured to ascertain the output signal as a function of the provided set of types of quantization, the training device configured to:

provide the set of types of quantization based on a set of possible types of quantization;

ascertain a set of output signals, each of the output signals of the set of output signals being associated with one type of quantization of the set of types of quantization;

ascertain a set of cost values, each cost value of the set of cost values being associated with one output signal of the set of output signals and describing to what extent the output signal corresponds to a desired output signal;

ascertain a total cost value based on the set of cost values; and train the classifier as a function of the total cost value, wherein a plurality of output signals using different types of quantization is ascertained for the input signal and based on the plurality of the output signals, an output uncertainty and/or an ensemble decision is ascertained, and wherein the classifier is configured to operate in batches, and for each batch of the batches, the set of types of quantization is predefined, one type of quantization is predefined randomly from the possible types of quantization, wherein the one type of quantization is predefined randomly by one of selecting, ascertaining, identifying, or determining the one type of quantization from the plurality of possible types of quantization.

15. A non-transitory machine-readable storage medium on which is stored a computer program for operating a classifier, the classifier being configured to ascertain an output signal as a function of an input signal supplied to the classifier, a set of types of quantization from a predefinable plurality of possible types of quantization being provided to the classifier, and quantize according to the possible types of quantization, wherein the classifier is configured to ascertain the output signal as a function of the provided set of types of quantization, the computer program, when executed by a computer, causing the computer to perform the following steps:

providing the set of types of quantization; and ascertaining a set of output signals, each of the output signals of the set of output signals being associated with one type of quantization of the set of types of quantization, wherein a plurality of output signals using different types of quantization is ascertained for the input signal and based on the plurality of the output signals, an output uncertainty and/or an ensemble decision is ascertained, and wherein the computer program is carried out in batches, and for each batch of the batches, in a step of predefining the set of types of quantization, one type of quantization is predefined randomly from the possible types of quantization, wherein the one type of quantization is predefined randomly by one of selecting, ascertaining, identifying, or determining the one type of quantization from the plurality of possible types of quantization.

* * * * *